United States Patent
Abernathy et al.

(10) Patent No.: US 12,276,854 B2
(45) Date of Patent: Apr. 15, 2025

(54) FLEXIBLE INDOOR/OUTDOOR HIGH-FIBER-COUNT CABLE

(71) Applicant: CORNING RESEARCH & DEVELOPMENT CORPORATION, Corning, NY (US)

(72) Inventors: George Cornelius Abernathy, Hildebran, NC (US); Mark Hanson Bushnell, Hickory, NC (US); Harold Edward Hudson, II, Conover, NC (US); William Carl Hurley, Hickory, NC (US); Toua Lo, Hickory, NC (US); William Welch McCollough, Jr., Lincolnton, NC (US)

(73) Assignee: Corning Research & Development Corporation, Corning, NY (US)

( * ) Notice: Subject to any disclaimer, the term of this patent is extended or adjusted under 35 U.S.C. 154(b) by 261 days.

(21) Appl. No.: 18/099,470

(22) Filed: Jan. 20, 2023

(65) Prior Publication Data
US 2023/0152544 A1 May 18, 2023

Related U.S. Application Data

(63) Continuation of application No. PCT/US2021/041519, filed on Jul. 14, 2021.

(60) Provisional application No. 63/055,988, filed on Jul. 24, 2020.

(51) Int. Cl.
G02B 6/44 (2006.01)

(52) U.S. Cl.
CPC .............. *G02B 6/44384* (2023.05)

(58) Field of Classification Search
CPC ................................... G02B 6/44384
See application file for complete search history.

(56) References Cited

U.S. PATENT DOCUMENTS

| 5,857,051 A | 1/1999 | Travieso et al. |
| 2003/0166749 A1* | 9/2003 | Eckstein ............ C08G 18/0895 524/101 |
| 2015/0004343 A1 | 1/2015 | Levchick et al. |

(Continued)

FOREIGN PATENT DOCUMENTS

| CN | 103333403 A | 10/2013 |
| EP | 0312267 A2 | 4/1989 |

OTHER PUBLICATIONS

European Patent Application No. 21846012.9 Extended European Search Report dated Aug. 6, 2024; 8 Pages; European Patent Office.

(Continued)

*Primary Examiner* — Sung H Pak
*Assistant Examiner* — Hoang Q Tran
(74) *Attorney, Agent, or Firm* — Thomas R. Irwin

(57) ABSTRACT

An optical fiber cable that includes subunits is provided. The cable has an outer jacket having a thickness of at least 2.0 millimeters and that is made from a fire retardant polymer material having a PHRR value of 222 kw/m² when tested in a cone calorimeter measured according to ASTM E1354 with a heat flux of 50 kW/m². The cable meets the requirement of UL 1666 burn test for riser cables and the requirements of EN 50399 burn test for CPR class $C_{ca}$ cables.

15 Claims, 3 Drawing Sheets

(56) References Cited

U.S. PATENT DOCUMENTS

2016/0133355 A1    5/2016  Glew et al.
2017/0023754 A1    1/2017  Debban et al.
2018/0320003 A1*  11/2018  Chen .................... G02B 6/4403

OTHER PUBLICATIONS

International Search Report and Written Opinion of the International Searching Authority; PCT/US2021/041519; dated Nov. 8, 2021; 9 pages; United States Patent Office.

* cited by examiner

FLEXIBLE INDOOR/OUTDOOR HIGH-FIBER-COUNT CABLE

CROSS-REFERENCE TO RELATED APPLICATIONS

This application is a continuation application of International Application No. PCT/US2021/041519 filed Jul. 14, 2021, which claims the benefit of priority under 35 U.S.C. § 119 of U.S. Provisional Application Ser. No. 63/055,988 filed on Jul. 24, 2020, the content of each of which is relied upon and incorporated herein by reference in its entirety.

BACKGROUND

Data center operators are demanding higher fiber count cables for optical connections within data centers. The cables are often routed through ducts that may be as small as 2 inches in diameter; therefore, high fiber density is required for the cables. Conventional high-fiber-count cables are usually stiff and difficult to bend, which hinders routing and installing the cables within the confined space of crowded equipment rooms in buildings. Cable installers prefer more flexible cables that do not display a preferential bend.

Cables installed within a building must meet national and local building codes for fire safety. Some fire codes allow an outdoor cable to run up to fifty feet within a building before being terminated into an equipment rack, but other fire codes limit this distance to two meters. A solution to this problem is to make a cable that meets the requirements for both indoor cables (e.g., fire safety and flexibility) and outdoor cables (e.g., UV light and water resistant, and works in a low temperature environment).

The fire safety of cables is determined by specific tests such as UL 1666 for Riser cables sold in the United States, EN 50399 for cables sold in Europe subject to the Construction Products Regulation (CPR), or IEC 60332-3 for cables sold in the Middle East. The performance in the burn tests is driven by the cable designs and materials. In general, PVC materials are used to pass the UL 1666 test, but EN 50399 prohibits halogenated compounds such as PVC. The large data center operators have a global network of data centers and prefer cable designs that meet the fire safety requirements of all regions, so that the same cable can be used anywhere in the world.

There is a need for flexible, high-fiber-count, universal cables that pass Riser, CPR and LSZH burn test requirements, are suitable for both indoor and outdoor use, and may be installed in a duct or cable trays.

SUMMARY

In one aspect, embodiments of the disclosure relate to an optical fiber cable including an outer jacket and a plurality of optical fiber carrying subunits. The outer jacket includes an inner surface and an outer surface that is an outermost surface of the optical fiber cable. A central bore extends within the inner surface in a longitudinal direction between first and second ends of the outer jacket. The plurality of optical fiber carrying subunits are located within the central bore, and each of the plurality of optical fiber carrying subunits includes a subunit jacket and a plurality of optical fibers. The outer jacket has a thickness of at least 2.0 millimeters and is made from a fire retardant polymer material having a PHRR value of 222 kw/m² when tested in a cone calorimeter measured according to ASTM E1354 with a heat flux of 50 kW/m². The cable meets the requirement of UL 1666 burn test for riser cables and the requirements of EN 50399 burn test for CPR class $C_{ca}$ cables.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, various embodiments of a high-fiber-count, indoor or indoor/outdoor cable designed to meet specific requirements of data center operators. The cable comprises an outer jacket made of a fire-retardant polymer, flexible strength members embedded within the jacket wall, a separation layer adjacent to the inner surface of the jacket and routable subunits containing stranded ribbons of optical fibers. The embodiments described herein have 3456 fibers or 6912 fibers, although the cables may incorporate any high fiber count suitable for the intended applications while having a fiber density greater than 4 fibers/mm².

Figure 1:
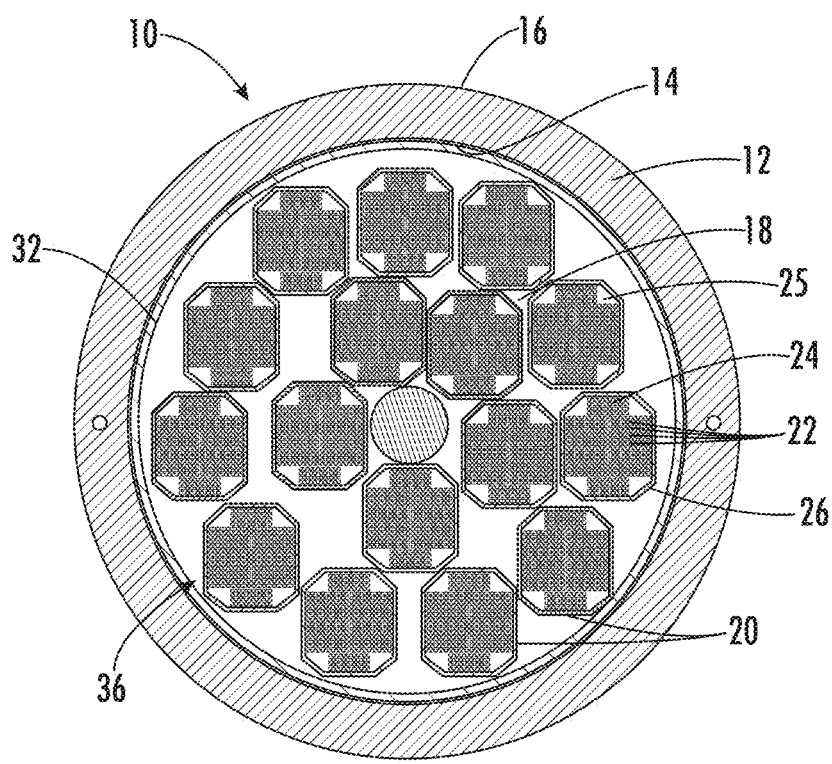
FIG. 1 depicts a cross-sectional view of an optical fiber ribbon cable, in accordance with aspects of the present disclosure.
Figure 2:
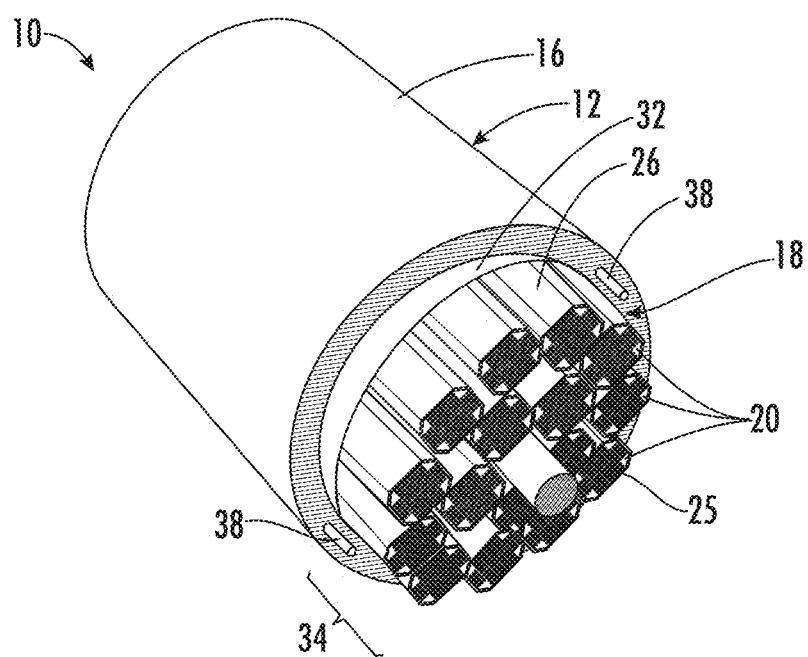
FIG. 2 depicts a perspective view of the optical fiber ribbon cable of FIG. 1, in accordance with aspects of the present disclosure.

FIG. 1 and FIG. 2 depict an optical fiber cable, shown as a ribbon cable 10, according to an exemplary embodiment.

The ribbon cable 10 includes a cable jacket 12 having an inner surface 14 and an outer surface 16. The inner surface 14 has an inner diameter and defines a central bore 18, and the outer surface 16 defines an outermost extent of the ribbon cable 10. In embodiments, the outer surface 16 defines an outer diameter of the ribbon cable 10. While the term "diameter" is used, the inner surface 14 and/or the outer surface 16 may not define a circle, and in such instances, "diameter" refers to the largest cross-sectional inner or outer dimension of the ribbon cable 10. Further, in embodiments, the inner surface 14 and the outer surface 16 define a thickness of the cable jacket 12.

In various embodiments, jacket 12 may comprise fire-retardant polymers that enable the cable to meet the burn test requirements of UL 1666 and EN 50399. The jacket materials may be a blend of olefinic polymers that add flexibility to the jacket 12. The jacket 12 may also contain high concentrations of fire retardants such as metal hydroxides, borates, and/or other suitable materials that enable the cable to pass the fire safety tests. These materials are often referred to as low smoke, zero halogen (LSZH) materials; fire retarded, non-corrosive (FRNC) materials; or fire retarded polyethylene (FRPE) materials.

The fire retardancy of the cable jacket 12 is evaluated in a cone calorimetry test that measures the peak heat release rate (PHRR), total heat release, total smoke release and other properties of the cable jacket material when exposed to fire conditions. The acrylates used as the fiber coatings and ribbon matrix materials release a high level of heat (high PHRR) when they burn. The PHRR for the acrylates is in the range of 1200 kW/m$^2$ to 2200 kW/m$^2$ when tested in a cone calorimeter measured according to ASTM E1354 at a heat flux of 50 kW/m$^2$ and a sample thickness of about 3.0 mm. To pass the EN 50399 burn test, the cable jacket must provide enough protection to the optical fibers and ribbons in the central bore 18 of the cable 10. The cable jacket 12 must be relatively thick and have a low PHRR value as determined in the cone calorimeter measured according to ASTM E1354 at 50 kW/m$^2$ heat flux. The cable jacket should be at least 2.0 mm thick and have a PHRR value of less than 225 kW/m$^2$. More preferably, the cable jacket should be at least 2.5 mm thick and have a PHRR value of less than 175 kW/m$^2$.

Disposed within the central bore 18 are a plurality of subunits 20. Each subunit 20 includes a plurality of ribbons 22. Each ribbon 22 includes a plurality of optical fibers 24 in a planar configuration. The optical fibers 24 may be held in the planar configuration using a ribbon matrix material. The plurality of ribbons 22 may be arranged in a ribbon stack 25, for example, and a subunit jacket 26 extruded around the ribbon stack 25 to form the subunit 20 into a unitary body. In various embodiments, the subunits 20 may be helically wound (e.g., wound around each other, wound around one or more central strength element), which facilitates bending and coiling of the ribbon cable 10, e.g., enhancing the routability of the ribbon cable 10.

The flexibility of a cable depends on many factors such as, for example, the presence of rigid strength members such as Glass Reinforced Plastic (GRP) rods, the thickness and flexibility of the cable jacket, and the stiffness of the cable components in the cable core. Aspects of the cables disclosed herein, such as cable 10, improve the flexibility of the cable jacket 12 by selecting a material the has a flexural modulus of less than 350 MPa when tested according to ASTM D790. In addition, cable 12 completely removes the GRP rods typical in conventional cables. GRP rods are added to cables to reduce the stress on the optical fibers when the cable is under a tensile load. However, cable 12 relies on the optical fibers 24 to be the strength members. Fiber strain during cable tension is kept below the required limits by having the stress distributed over so many optical fibers 24 in cable 10.

However, conventional GRP rods provide two other important functions besides tensile strength, namely, contraction resistance and jacket stretch prevention. One function of the GRP rods in conventional cables is shrinkage resistance against the polymers of the cable jacket contracting at low temperature. When the cable jacket shrinks at low temperature, it applies a compressive force on the optical fibers and ribbons in the cable. If the jacket shrinks too much, the contraction force can cause the optical fibers to buckle and have increased attenuation, i.e. loss of optical signal. In accordance with aspects of the present disclosure, the cable 10 is made without GRP rods to improve flexibility. However, the cable design must compensate for the lack of shrinkage resistance. Design of the subunits 20 internal to the outer cable jacket 12 counteract the compressive force of the cable jacket 12 as it contracts or shrinks. The close-fitting subunit jacket 26 of the subunit 20 couples the ribbons 22 together, so the ribbons act as a unit rather than as individual ribbons. Thus, the anti-buckling force of the subunit 20 is much greater than the sum of the anti-buckling forces of the individual ribbons 22. The bending moment of a ribbon 22 depends on the thickness of the ribbon raised to the fourth power. The bending moment of the ribbon stack 25 depends on the thickness of the ribbon stack raised to the fourth power. Thus, the increase in the bending moment is exponential with the thickness rather than additive. However, to achieve this multiplication effect, the individual ribbons 22 must be coupled together. The close-fitting subunit jacket 26 is the coupling agent that achieves the multiplication effect.

Another function of conventional GRP rods is to prevent stretching of the cable jacket 12 when the cable 10 is pulled through a duct during installation. Friction between the jacket 12 and the inner wall of the duct causes the jacket 12 to stretch as, for example, the cable 10 is pulled around a bend in the duct. When the tension is released, the stretched portion of the jacket 12 relaxes back to its original length. This stretch and relax mechanism is known to impart contraction force on the optical fibers 24 and can lead to buckling of the fibers and increased attenuation. In accordance with aspects of the present disclosure, the cable jacket 12 may include a plurality of strengthening members, shown as strengthening yarns 38, contained within the material of the cable jacket 12 between the inner surface 14 and the outer surface 16. The strengthening yarns 38 are embedded within the jacket wall to provide enough tensile strength to prevent the jacket 12 from stretching. In an embodiment, the ribbon cable 10 includes two strengthening yarns 38 disposed within the cable jacket 12 equidistantly spaced around the cable jacket 12. In embodiments, the strengthening yarns 38 are textile yarns. Exemplary textile yarns suitable for use as the strengthening yarns 38 include at least one of glass fibers, aramid fibers, cotton fibers, or carbon fibers, among others.

Additionally, the jacket 12 has a surface hardness of 45 on the Shore D scale when tested according to ASTM D2240. Thus, the design and materials selection of the cable enable the elimination of conventional, rigid GRP rods while provided sufficient other means to limit shrinkage and stretch. Embodiments of cable 10 may also eliminate the strengthening yarns 38 altogether if the cable 10 is not required to be pulled through ducts.

In accordance with yet other aspects of the present disclosure, cable 10 may have a water barrier layer 32 provided in the cable core and/or UV resistant jacket material added to the cable jacket 12 to produce a cable that is suitable for both indoor and outdoor applications. The water barrier layer 32 is located within jacket 12 and surrounds subunits 20. Water barrier layer 32 absorbs water which in turn prevents or limits water from traveling along cable 10 and/or from contacting the subunits 20. In embodiments, and as shown in FIGS. 1 and 2, the water barrier layer 32 is a water-blocking tape, e.g., that absorbs water and/or swells when contacted with water. The water-blocking tape prevents the molten jacket material from sticking to the subunits 20 during extrusion. The water-blocking tape also reduces the friction that would occur as the subunits 20 press against the jacket 12 when the cable 10 is experiencing a loading condition, such as during bending. Both functions of the water-blocking tape increase the flexibility of the cable jacket. In other embodiments, the water barrier layer 32 may be an SAP powder applied to the exterior of the subunits 20 and/or the inner surface 14 of the cable jacket 12. These features may not be necessary when the intended application space for the cable is indoor use only. As used herein, all of the components from the water barrier layer 32 inward are referred to as the cable core 34.

A high-fiber-count cable may have six, twelve or more subunits 20. As shown in FIGS. 1 and 2, cable 10 has sixteen subunits 20, each subunit 20 having 432 optical fibers configured as ribbons 22 arranged in ribbon stacks 25 for a total fiber count of 6912 fibers. The subunits 20 may be arranged as shown with five subunits 20 stranded around a central member to form an inner subunit layer and eleven subunits 20 stranded around the five subunits. Because of the multiple ribbon stacks 25, there will always be one or more stacks oriented against the preferential bend direction when the cable 10 is bent. This could make the cable very stiff. However, FIG. 1 shows that there is more space within the jacket 12 than necessary to contain the optical fibers. This free space 36 enables the ribbon subunits 20 to move around within the jacket 12 to minimize the effects of preferential bending when the cable 10 bends, which results in a flexible cable.

Figure 3:
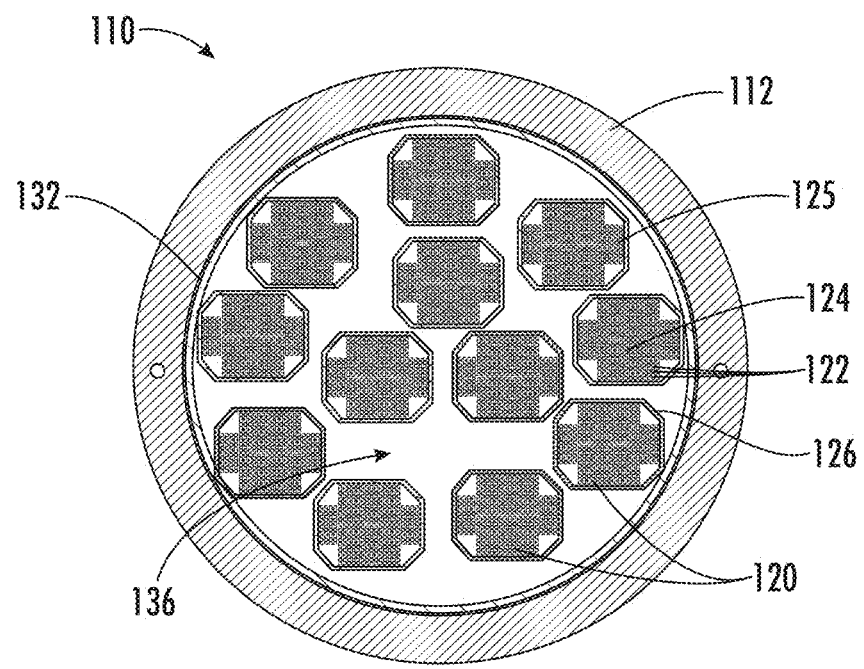
FIG. 3 depicts a cross-sectional view an optical fiber cable, in accordance with aspects of the present disclosure.
Figure 4:
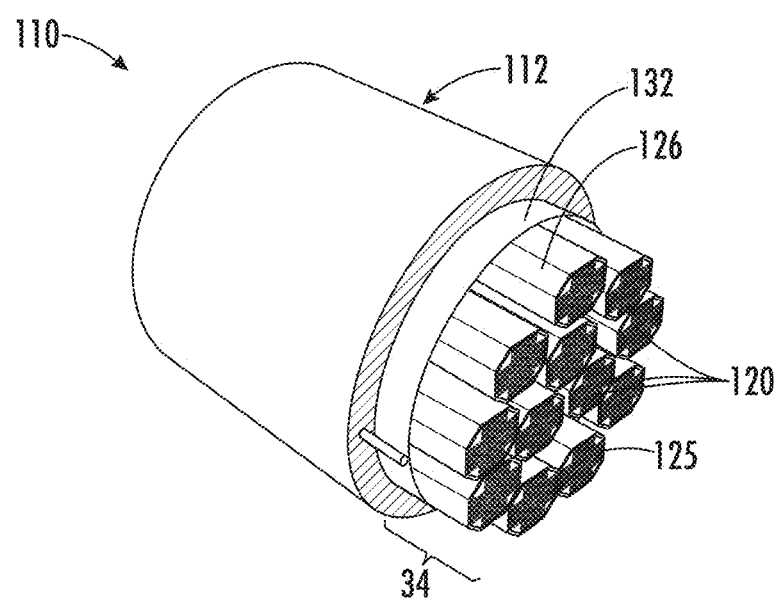
FIG. 4 depicts a perspective view of the optical fiber ribbon cable of FIG. 3, in accordance with aspects of the present disclosure.

Referring to FIG. 3 and FIG. 4, ribbon cable 110 is shown, respectively, according to exemplary embodiments. Ribbon cable 110 is substantially the same as ribbon cable 10, except for the differences discussed herein. Ribbon cable 110 has twelve subunits 120 that each contain 288 optical fibers 124 configured as ribbons 122 arranged in ribbon stacks 125 for a total fiber count of 3456 fibers. Each subunit 120 has a subunit jacket 126 extruded around the ribbon stack 125 so the subunit 120 acts as a unitary body. FIG. 3 shows the subunits 120 have moved radially outward and press against a tape layer 132 which presses against the cable jacket 112. The free space 136 is now seen as the space between the individual subunits 120 instead of space between the jacket and the subunits.

The flexibility of the cables disclosed herein are affected by the flexibility of the components in the cable core. A stack of optical fiber ribbons exhibits significant stiffness against bending in the plane parallel to the plane of the ribbons but is flexible in the plane normal to the ribbons. The property of having different flexibility or stiffness based on the bending direction is referred to as preferential bending, i.e. the ribbon prefers to bend in one plane more than in the other. Fiber optic ribbon cables achieve flexibility by stranding the ribbon stacks, so orientation of the ribbon stack changes over the arc of the bend.

The high-fiber-count cables 10, 110 in accordance with the disclosure herein have ribbon stacks 25, 125 in multiple subunits 20, 120 that are stranded together to make the cable core 34, 134. To overcome stiffness, cables 10, 110 achieve flexibility by providing the free space 36, 136 within the cable jacket 12, 112 for the subunits 20, 120 to move radially outward as the cable 10, 110 bends. The amount of free space 36, 136 needed to provide the desired flexibility has been determined experimentally to be 1.5 mm or more. Therefore, the inner diameter of the jacket 12 is determined from Equation 1 below:

$$D \geq d\left[\frac{1}{\sin(\pi/n)} + 1\right] + 1.5 \quad \text{(Equation 1)}$$

where d is the average diameter of a subunit in millimeters, and n is the number of subunits adjacent to the cable jacket 12. FIG. 1 shows cable 10 with eleven subunits 20 adjacent to the jacket (n=11). FIG. 3 shows cable 110 with nine subunits 120 adjacent to the jacket (n=9). The inner diameter of the cable jacket D is about 29 mm for cable 120 with n=9 and d=6.5 mm. A free space of 1.5 mm is an increase of only about a 5% in the jacket inside diameter. Such a small increase in the cable jacket diameter can have such a surprisingly large increase in the flexibility of the cable.

Figure 5:
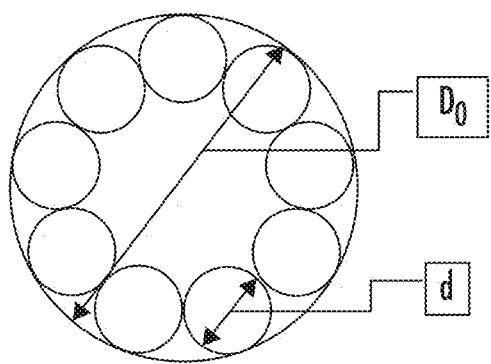
FIG. 5 is an illustration of subunit packing without free space, in accordance with aspects of the present disclosure.
Figure 6:
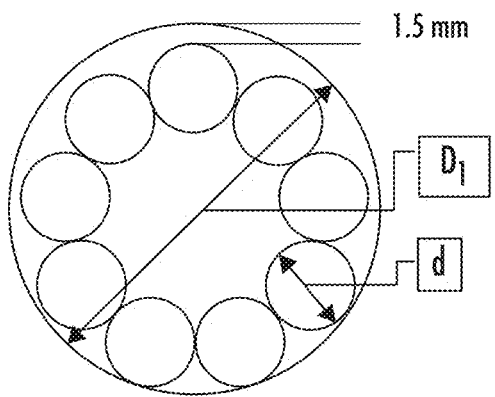
FIG. 6 is an illustration of subunits arranged within a cable jacket with free space, in accordance with aspects of the present disclosure.

FIGS. 5 and 6 illustrate the concept of free space. FIG. 5 shows nine smaller circles of diameter d surrounded by a larger circle of diameter $D_0$. The smaller circles represent subunits and the larger circle represents either the tape layer or the inner diameter of the cable jacket. Each subunit is touching the adjacent subunits and the jacket wall. This defines a configuration with no free space. Thus, if the diameter of the subunit d used in equation 1, then the calculated value/would be the size of $D_1$ with the 1.5 mm free space.

FIG. 6 shows the same configuration of subunits as FIG. 5 where each subunit is touching two adjacent subunits in a circular pattern. In FIG. 6 the circle representing the cable jacket has been increased in size to a diameter of $D_1$ so there is a gap of 1.5 mm between the large circle and the subunits. This illustrates a cable with 1.5 mm of free space. The embodiments described herein allow for a wide range of installation and operation temperatures and reduce the likelihood of failures by allowing for the subunits and the ribbons within them to more easily move to low stress positions.

The optical performance of the cables disclosed herein are affected by the materials and production methods of the cables. For example, a stiffer subunit jacket material will increase the rigidity of the subunits to provide greater resistance to contraction at low temperatures; however, the stiffer subunits are more difficult to route in equipment racks. The subunits may be made with a softer sheath material to improve the ease of routing the subunits within equipment racks and improve the flexibility of the cable. The flexibility of the cables disclosed herein may thus be tailored to meet the specific requirements of the intended application of the cable.

Subunits made with a stiffer sheath material may present some problems in stranding the subunits into the cable core configuration. The ribbon stack of a subunit is stranded, or twisted, before the subunit sheath is applied. Then a group of subunits are stranded together to form the cable core. Two of the defining features of the stranding are the lay length and the type of stranding. The lay length is the distance over which the stranded element makes a 360-degree twist. The stranding may be helical or SZ stranding, and the subunits may be stranded into the core with wither lar lay or lang lay. Cables in which the subunits comprise standard optical fiber ribbons are usually made with helical stranding. The subunits may be stranded into the core with either regular lay or lang lay. In accordance with aspects of the present disclosure, cables having subunits made with the softer subunit sheath may have the subunits stranded using either regular lay or lang lay, but cables with the subunits made with the stiffer sheath should only have the subunits stranded with regular lay. Lang lay stranding of the subunits, combined with a stiffer subunit sheath, causes higher attenuation in the optical fibers. In accordance with yet other aspects of the present disclosure, the lay length of the subunits in the core compared to the lay length of the ribbons or ribbon stacks within the subunits impacts the optical performance of the cables The stress on the optical fibers is increased when the lay length of the subunits in the cable core is near the lay length of the ribbons in the subunits. Furthermore, the stress on the fibers is greater with lang lay than with regular lay. Acceptable stress levels were obtained with lang lay when the difference in lay lengths between the ribbons and the subunits was at least 300 mm. Cables with regular lay may achieve acceptable stress levels with a lay length difference of 200 mm. Accordingly, cables may be made with regular lay or lang lay by adjusting the lay lengths of the ribbons in the subunits and the subunits in the core.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable comprising:
    an outer jacket comprising a first inner surface and a first outer surface defining an outermost surface of the optical fiber cable, the first inner surface defining a central bore extending in a longitudinal direction between first and second ends of the outer jacket, wherein the outer jacket has a thickness of at least 2.0 millimeters and is made from a fire retardant polymer material having a PHRR value of 222 kw/m$^2$ when tested in a cone calorimeter measured according to ASTM E1354 with a heat flux of 50 kW/m$^2$,
    a plurality of optical fiber carrying subunits located within the central bore, each of the plurality of optical fiber carrying subunits comprising:
        a subunit jacket located within the central bore, the subunit jacket comprising a second inner surface and a second outer surface, the second inner surface defining an inner bore extending in a longitudinal direction between first and second ends of the subunit jacket; and
        a plurality of optical fibers located within the inner bore and extending in the longitudinal direction between the first and second ends of the subunit jacket, wherein the plurality of optical fibers are configured as ribbons and arranged in a ribbon stack.

2. The optical fiber cable of claim 1, wherein the plurality of optical fibers is at least 3456 optical fibers.

3. The optical fiber cable of claim 1, wherein the cable meets the requirement of UL 1666 burn test for riser cables and the requirements of EN 50399 burn test for CPR class $C_{ca}$ cables.

4. The optical fiber cable of claim 1, wherein a free space of at least 1.5 millimeters is provided between the outer jacket and an outer circumference of the plurality of subunits when pressed together circumferentially.

5. The optical fiber cable of claim 1, wherein the outer jacket comprises a blend of olefinic polymers.

6. The optical fiber cable of claim 1, wherein the plurality of subunits are helically wound to facilitate bending and coiling of the optical fiber cable.

7. The optical fiber cable of claim 1, wherein the outer jacket further comprises strengthening yarns disposed between the first inner surface and the first outer surface.

8. The optical fiber cable of claim 7, wherein the strengthening yarns includes two strengthening yarns disposed within the outer jacket such that each strengthening yarn is equidistantly spaced around the outer jacket.

9. The optical fiber cable of claim 1, wherein the outer jacket has a surface hardness of 45 on the Shore D scale when tested accorded to ASTM D2240.

10. The optical fiber cable of claim 1, further comprising a water barrier layer surrounding the plurality of subunits.

11. The optical fiber cable of claim 10, wherein the water barrier layer is a water-blocking tape.

12. The optical fiber cable of claim 1, wherein the plurality of subunits comprises sixteen subunits.

13. The optical fiber cable of claim 12, wherein the plurality of optical fibers in each subunit comprises 432 fibers.

14. The optical fiber cable of claim 1, wherein the outer jacket is devoid of any GRP rods.

15. The optical fiber cable of claim 1, wherein the outer jacket comprises a material having a flexural modulus of less than 350 MPa when tested according to ASTM D790.

* * * * *